United States Patent [19]
Tuccelli et al.

[11] Patent Number: 5,522,991
[45] Date of Patent: Jun. 4, 1996

[54] CELLULOSIC ULTRAFILTRATION MEMBRANE

[75] Inventors: Ronald Tuccelli, Winchester; Paul V. McGrath, Bedford, both of Mass.

[73] Assignee: Millipore Investment Holdings Limited, Wilmington, Del.

[21] Appl. No.: 277,806

[22] Filed: Jul. 20, 1994

[51] Int. Cl.⁶ .................................................. B01D 71/16
[52] U.S. Cl. .................. 210/490; 210/500.29; 210/500.3
[58] Field of Search ................. 210/500.29, 490, 210/500.3, 500.34, 500.44, 500.27, 500.31, 500.32, 506; 264/48, 49

[56] References Cited

U.S. PATENT DOCUMENTS

| | | | |
|---|---|---|---|
| 3,762,566 | 10/1973 | Del Pico | 210/500.3 |
| 3,775,308 | 11/1973 | Yasuda | 210/500.29 |
| 3,894,166 | 7/1975 | Brown et al. | 210/500.29 |
| 4,604,204 | 8/1986 | Linder et al. | 210/500.3 |
| 4,618,553 | 10/1986 | Yayama et al. | 430/69 |
| 4,826,599 | 2/1989 | Rikson et al. | 210/500.3 |
| 4,944,879 | 7/1990 | Steuck | 210/500.27 |
| 4,990,255 | 2/1991 | Blume et al. | 210/500.27 |
| 5,053,132 | 10/1991 | Sirkar | 210/500.3 |
| 5,063,009 | 11/1991 | Mizutani et al. | 210/500.29 |

FOREIGN PATENT DOCUMENTS

| | | | |
|---|---|---|---|
| 1038103 | 2/1989 | Japan | 210/500.29 |
| 3068430 | 3/1991 | Japan | 210/500.29 |

*Primary Examiner*—Frank Spear
*Attorney, Agent, or Firm*—Andrew T. Karnakis; Paul J. Cook

[57] ABSTRACT

A cellulosic ultrafiltration membrane is provided having a microporous base resistant substrate and an ultrafiltration layer form of a cellulose ester or cellulose.

60 Claims, 5 Drawing Sheets

CELLULOSIC ULTRAFILTRATION MEMBRANE

BACKGROUND OF THE INVENTION

This invention relates to high strength ultrafiltration membranes and to a process for producing such membranes. More particularly, this invention relates to high strength cellulosic ultrafiltration membranes made from a microporous polymeric base-resistant substrate and a thin cellulose or cellulose ester polymer ultrafiltration layer.

Microporous and open ultrafiltration membranes include thin sheets and hollow fibers generally formed from polymeric material and having a substantially continuous matrix structure containing open pores or conduits of small size. The pore size range for pores of microporous membranes are generally understood to extend from about 0.05 microns to about 10 microns. Composite ultrafiltration (UF) membranes are UF membranes formed on a pre-existing microporous membrane substrate. The composite membranes have better integrity (higher bubble points) than UF membranes cast from the same polymer solutions onto traditional non-woven backing materials such as a non-woven polyester substrate. For example, U.S. Pat. No. 4,824,568 discloses high bubble point membranes that are composites of polyvinylidene fluoride (PVDF) or polyethersulfone solutions coated onto a 0.22 micron PVDF microporous substrate. The PVDF solutions are based on solvents that also soften a portion of the PVDF substrate. It is presently believed that this solvent bonding is necessary in order to prevent delamination of the composite structure. However, European Patent Application number 93,117 495.7 having publication number 0596411A2 teaches that the use of such a solvent system is undesirable since it can soften the microporous substrate. The use of PVDF also is disadvantageous since PVDF is attacked by common cleaning and sanitizing agents such as 0.5N NaOH. These PVDF based composites, therefore, are not appropriate for use in process streams that foul membranes such as serums, fermentation broths or other protein separation processes which then must be cleaned and sanitized by NaOH.

At the present time, ultrafiltration membranes comprised of cellulose are used in applications where low protein binding and low fouling characteristics are required. Cellulose ultrafiltration membranes are formed by immersion casting of a cellulose acetate polymer solution onto a non-woven fabric substrate formed, for example, from polyethylene or polypropylene. The non-woven substrate has relatively large pores, typically in the order of several hundred microns in effective diameter in comparison to the UF layer formed on it. The UF layer is typically bound to some degree to the substrate by mechanical interlocking of the UF layer and the substrate. The cellulose acetate is then hydrolyzed to cellulose by using a strong base such as 0.5N NaOH.

Alternatively, cellulose can be dissolved in solutions of solvents such as dimethylacetamide (DMAC) or N-methyl pyrrolidone (NMP) with the addition of a salt such as lithium chloride. This cellulose solution can be used to form the composite membrane and subsequently eliminate the need for base hydrolysis.

While these composite membranes are considered to be generally satisfactory, they are not considered to be defect free. A defect is an area of the membrane where a void or rupture in the UF layer will allow passage of particles significantly larger than the retention limit dictated by the UF layer. These defects can result from fibers of the non-woven substrate extending though the UF layer or from gas bubbles retained in the solution from which the cellulose acetate layer is precipitated and coagulated which rupture the UF layer. In addition, defects are caused by the relatively high variability of the non-woven substrate thickness which increases the difficulty of achieving a uniformly thick UF layer. The resultant variable UF layer thickness results in variable permeability and retention performance.

Presently available cellulosic membranes have an undesirably low mechanical strength in that they are easily ruptured when subjected even to low back pressure or when folded even to a minor degree. Delamination of presently available cellulosic membranes is commonly observed at low back pressures of about 3 to 15 psi. Since such membranes can be exposed to some back-pressure during use, resistance to delamination under such back-pressure conditions is desirable.

Accordingly, it would be desirable to provide a cellulosic ultrafiltration membrane which is free of defects, exhibits low protein binding, is stable in high pH solutions, is highly resistant to high back pressure and is mechanically stable even when folded. Such a composite membrane could be highly useful for processing protein-containing solutions under conditions of repeated use. It would also maintain membrane integrity while under conditions of pressure normally encountered during use.

SUMMARY OF THE INVENTION

The present invention provides a defect free cellulosic ultrafiltration membrane formed from a microporous polymeric substrate which is resistant to high pH (base) conditions and a cellulose ester or cellulose ultrafiltration layer. The thickness of the ultrafiltration layer is controlled so that it is rendered defect free. The degree of penetration of the cellulose ester or cellulose into the base resistant microporous polymeric layer is controlled so as to prevent excessive plugging of the substrate pores thereby to maintain desirable flux characteristics for the cellulosic membrane. The degree of penetration of the cellulose ester or cellulose into the base resistant polymeric microporous layer is also controlled to obtain a sufficiently strong bond between the two layers. This renders the cellulosic membrane highly resistant to delamination.

The cellulosic ultrafiltration membrane of this invention can be formed by passing a base resistant polymeric microporous substrate and a solution of cellulose or a cellulose ester into a nip formed by (a) a rubber roll with or without a film thereon and (b) a rotating cylinder. The thickness of the ultrafiltration layer and the degree of penetration of the ultrafiltration layer into the microporous layer is controlled by the pressure at the nip, the durometer (hardness) and diameter of the rubber roll, solution viscosity and process speed. Optionally, the cellulose or cellulose ester solution can be applied to the base resistant microporous polymeric substrate by a conventional knife-over-roll or slot die coating methods. The coated microporous substrate is then contacted with a non-solvent for the cellulose or cellulose ester to effect its precipitation to form the ultrafiltration layer. The cellulose ester can be convened to cellulose by reaction with a base such as NaOH.

DESCRIPTION OF SPECIFIC EMBODIMENTS

Figure 1:
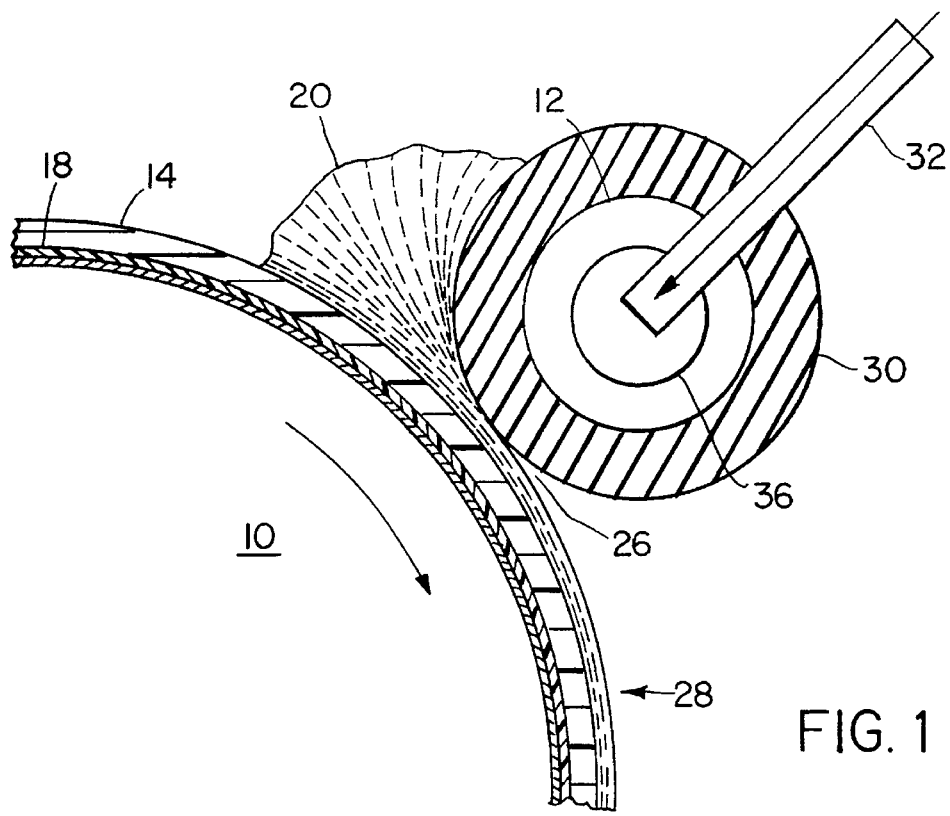
FIG. 1 illustrates an apparatus suitable for forming the composite ultrafiltration membrane of this invention.

The defect-free cellulosic membrane of this invention comprises a nonfibrous base resistant polymeric microporous substrate coated with an ultrafiltration layer formed of a cellulose or cellulose ester polymer. A major advantage of the cellulosic membranes of this invention is that they are resistant to degradation by contact with strong alkali solution, such as 0.5N NaOH. The composite membranes of this invention are also resistant to back pressures far exceeding those of the prior art and usually as high as about 100 psi. The bond between the substrate and the ultrafiltration layer can be made sufficiently strong as to exceed the burst strength of the overall membrane. In addition, since the cellulosic ultrafiltration membrane is defect free, the integrity of the ultrafiltration membrane of the invention is substantially superior to the integrity of prior-art composite membranes.

The base resistant microporous polymeric membrane has pore sizes between about 0.05 and 10 microns, preferably between about 0.2 and 1.0 microns. Suitable base resistant microporous membrane substrates are formed from a polyolefin such as polyethylene or polypropylene; polysulfone, polyethersulfone, polyarylsulfone, polytetrafluoroethylene, cellulose or the like. Particularly suitable microporous membrane substrates are formed from ultrahigh molecular weight polyethylene (UHMW-PE) such as those disclosed by U.S. Pat. Nos. 4,828,772 and 4,778,601 which are incorporated herein by reference. A particularly suitable microporous polypropylene membrane substrate is disclosed by U.S. Pat. No. 4,874,567 which is incorporated herein by reference. The base resistant microporous polymeric membrane substrate is not degraded when contacted with a base solution utilized to convert cellulose ester to cellulose.

The ultrafiltration layer is formed from a solution of cellulose or a cellulose ester such as cellulose diacetate, cellulose triacetate, cellulose nitrate or mixtures thereof. After being deposited on the microporous membrane substrate the cellulose ester can be converted to cellulose by reaction with an aqueous basic solution such as NaOH, KOH, LiOH at a pH between about 11.8 and 12.2. The cellulose ester solution is formed with a solvent composition such as acetone, N-methyl pyrrolidone (NMP), dimethylacetamide (DMAC), mixtures thereof or the like.

Coating techniques useful for forming the composite ultrafiltration membrane are disclosed for example by U.S. Pat. Nos. 5,017,292 and 5,096,637 which are incorporated herein by reference.

Polymer solutions containing between about 8 and 25% by weight of the cellulose ester or cellulose polymer in a solvent can be utilized in the present invention. Such solutions can be coated to a dry thickness above the microporous substrate of from about 1 microns to 20 microns, preferably from about 5 to about 15 microns. Controlling the coating thickness within these limits promotes penetration of the coating into the substrate over a distance between about 5 and 30 microns, preferably between about 15 and 25 microns. This results in a cellulosic membrane which can be folded or subjected to moderate or high back pressures without rupturing the cellulosic membrane.

After the cellulose ester polymer solution has been cast onto the microporous membrane, the ultrafiltration membrane structure is formed by immersing the coated microporous structure into a liquid which is miscible with the polymer solvent but is a non solvent for the dissolved cellulose or cellulose ester polymer. Water is the preferred liquid, although other liquids can be employed such as water-alcohol, water-polymer solvent, water-glycerin mixtures.

Membrane formation occurs by precipitation of the polymer from the polymer solution. The precipitated polymer forms a porous membrane which may or may not be "skinned" or have an asymmetric structure typical of some ultrafiltration membranes but which is substantially defect free. The properties of the membrane can be varied by controlling such parameters as the percent polymer in solution, solvent type, additives, coating thickness, immersion bath composition, immersion bath temperature, etc.

In an aspect of this invention, a hydrophobic microporous base resistant membrane substrate can be modified to render it hydrophilic prior to applying the precursor polymeric solution which forms the ultrafiltration membrane layer. An example of a suitable process is disclosed in U.S. Pat. No. 4,618,533 which is incorporated herein by reference. A membrane having a completely hydrophilic surface is particularly useful when filtering aqueous liquid compositions.

Referring to FIG. 1, coating thickness is controlled by forming a nip between a rotating drum 10 and a non-rotating rubber coated cylinder 12. The microporous substrate 14 can be positioned on an optional support web 18 which contacts the backed drum or roll 10 which can be rotating. The cast polymer solution 28 forms the skin in the final composite membrane of this invention.

In operation, cellulose or a cellulose ester casting solution 20 is fed to a reservoir on the web entry side of the nip point 26 of the rubber covered cylinder 12 and the drum 10. The moving microporous substrate 14 drags solution under the nip 26 analogous to journal bearing lubrication. Coating thickness can then be varied by adjusting the inlet pressure to the pneumatic cylinders 32.

Figure 1A:
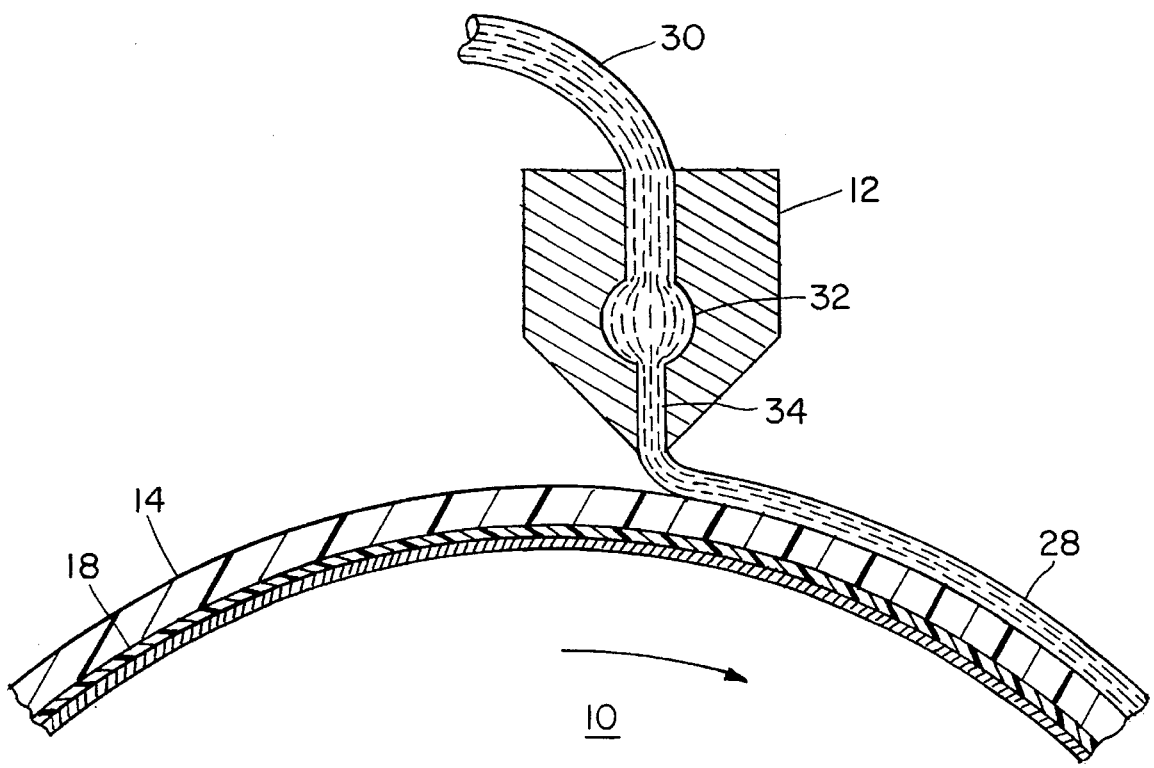
FIG. 1A illustrates an alternative apparatus suitable for forming the composite ultrafiltration membrane of this invention.

Referring to FIG. 1A, coating thickness is controlled in an alternative apparatus by changing the width of the slot 34, the delivery rate of the polymer solution 30 which is fed to the slot die 12 by means of a suitable positive displacement pump such as a variable speed precision gear pump or the substrate speed. In practice, solution viscosity and casting speed are set primarily by membrane property requirements. The width of the gap 34 is sized based on polymer solution viscosity and thickness of coating (volume) required. The equalization chamber 32 is used to uniformly distribute polymer solution along the entire width of the gap 34.

Figure 1B:
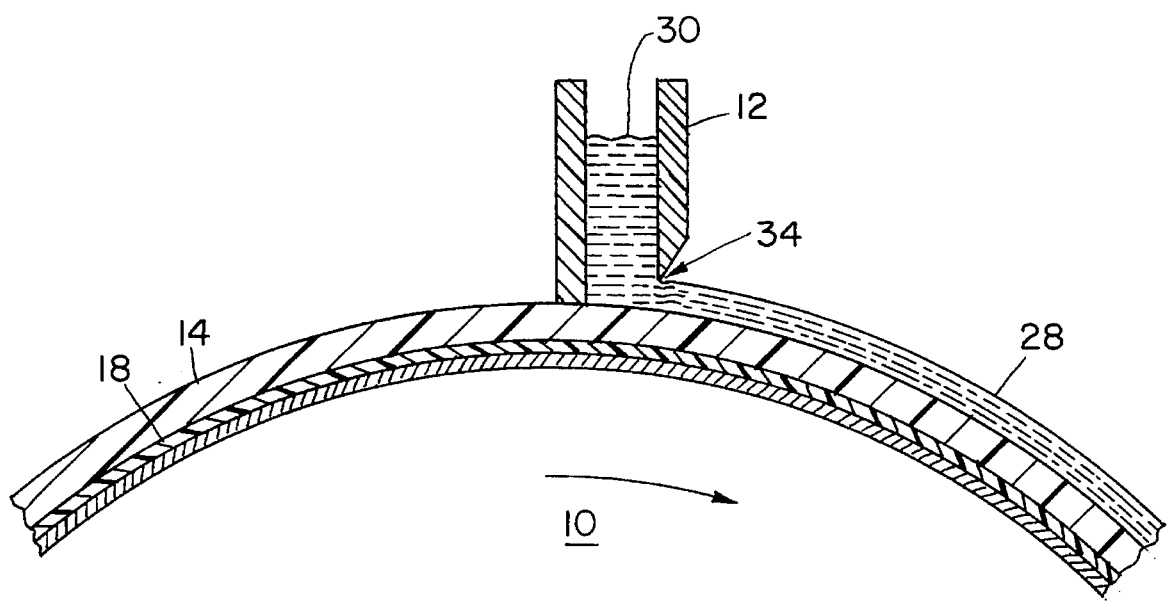
FIG. 1B illustrates an alternative apparatus suitable for forming the composite ultrafiltration membrane of this invention.

Referring to FIG. 1B, coating thickness is controlled in a second alternative apparatus by changing the gap 34 between the knife 12 and the substrate 14 to be coated. The coating thickness is also affected by the reservoir height and substrate speed. In practice, the polymer solution is fed to reservoir 30 at a rate which will maintain the solution level in the reservoir constant and the casting (substrate) speed is set primarily by membrane property requirements.

After the membrane structure has formed, the composite web is washed by conveying the coated and precipitated web through a water bath. Contact time of approximately 2 minutes in 25° C. water, for example, is sufficient. When initially coating with a cellulose ester solution, the cellulose ester UF composite is then treated with NaOH at high pH to hydrolyze the UF layer. The regenerated cellulose UF composite is then soaked in a humectant solution such as glycerin and water. Drying can then be performed by leaving the rewashed web to dry as single sheets at room temperature. Alternatively, the web can be continuously dried by conveying the web over a heated roll.

The following examples illustrate the present invention and are not intended to limit the same.

EXAMPLE 1

This example illustrates a process making a 15 kD nominal molecular weight cutoff composite ultrafiltration membrane.

Ultrahigh-molecular-weight polyethylene microporous membrane produced by the process of U.S. Pat. Nos. 4,778,601 and 4,828,772 having an average pore size of 0.3–0.4 micrometers were employed as the microporous membrane substrate.

A polymer solution containing 20.0 wt % cellulose acetate in 80.0 wt % N-methyl pyrrolidone (NMP) (solvent) was cast onto the microporous polyethylene membrane at a speed of 10 feet per minute utilizing the applicator of FIG. 1 with 45 psi applied pressure. The NMP solvent is not a solvent for the polyethylene substrate. Thus, there is no adhesion between the polyethylene and the cellulose acetate due to solvent bonding. The coated membrane was then immersed in a water bath maintained at a temperature of 30° C. The composite membrane thus produced was subsequently immersed in 0.5N NaOH at 20° C. for 4 hours in order to convert the cellulose acetate to cellulose by hydrolysis. The composite membrane then was washed in water and treated with 20 vol % glycerine in water solution to act as a humectant. It was subsequently dried by conveying the web over a drying roll heated to about 130° F.

Figure 3:
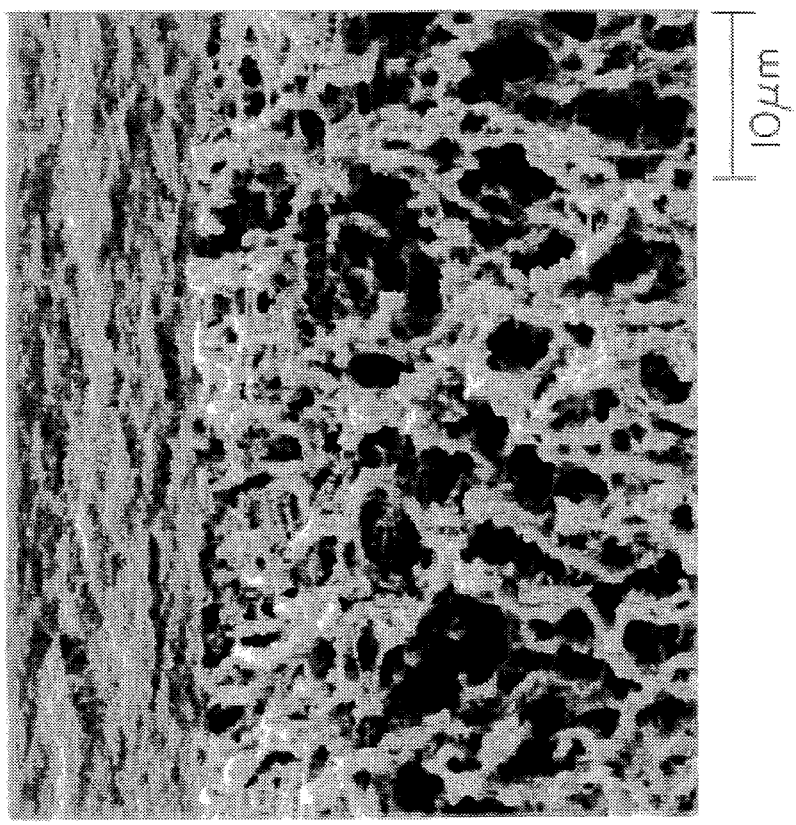
FIG. 3 is a photomicrograph at 1994× magnification of the cross section of a membrane of FIG. 2 showing the cellulose ultrafiltration layer and its interlocking with the microporous ultra-high-molecular-weight polyethylene substrate.
Figure 2:
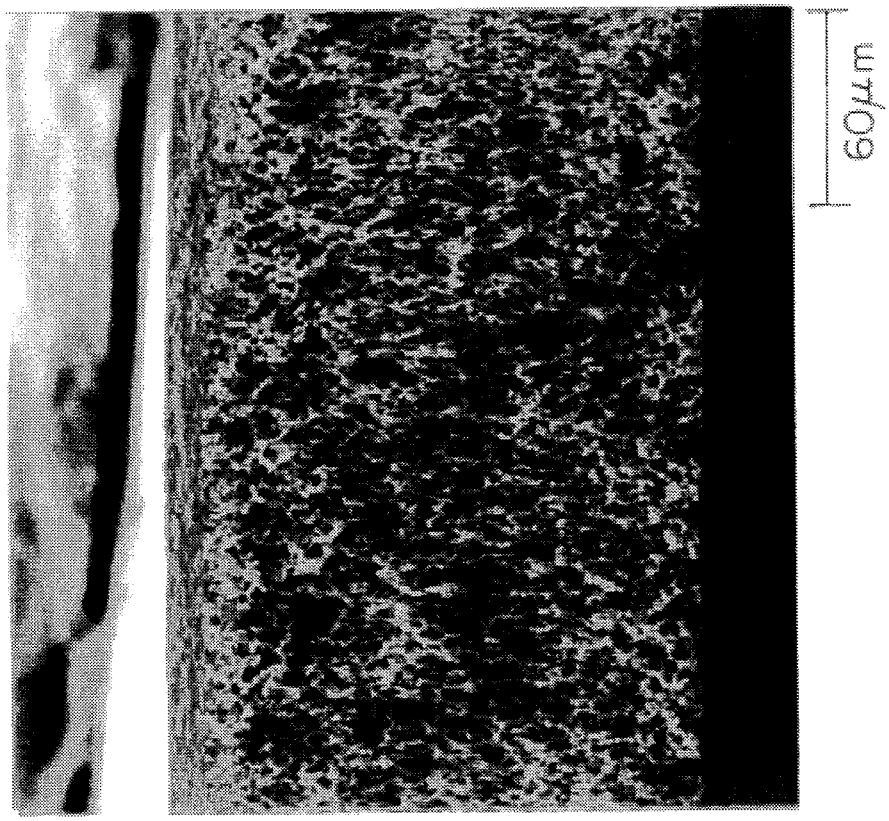
FIG. 2 is a photomicrograph at 396× magnification of the cross section of the membrane typical of this invention.

The cross-section of the composite membrane produced is shown in FIGS. 2 and 3. The depth of cellulose infiltration into this polyethylene substrate was approximately 10 microns and the depth of the polyethylene substrate free of cellulose was about 135 microns. The thickness of the cellulose coating above the surface to the UHMW-PE substrate was about 11 microns. The composite membrane was free of defects and had the flux and retention characteristics listed in Table 1.

EXAMPLE 2

This example illustrates a process making a 110 kD nominal molecular weight cutoff composite ultrafiltration membrane. The method used for Example 2 is the same as in Example 1 with the following exceptions: the polymer solution used was composed of 12.0 wt % cellulose acetate in 88.0 wt % N-methyl pyrrolidone (NMP), the coated membrane was immersed in a water bath maintained at a temperature of 10° C. All other process steps were the same.

Figure 5:
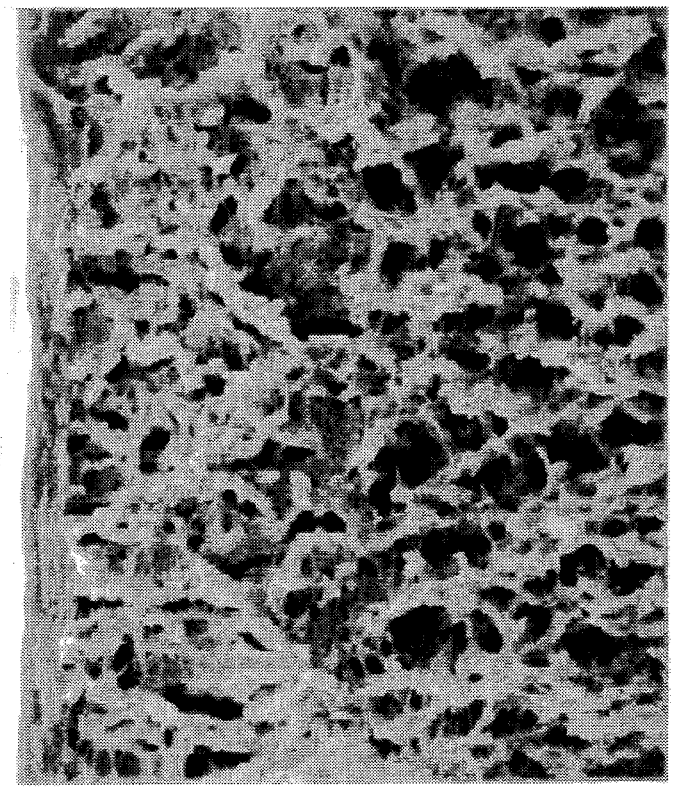
FIG. 5 is a photomicrograph at 1060× magnification of the membrane of FIG. 4.
Figure 4:
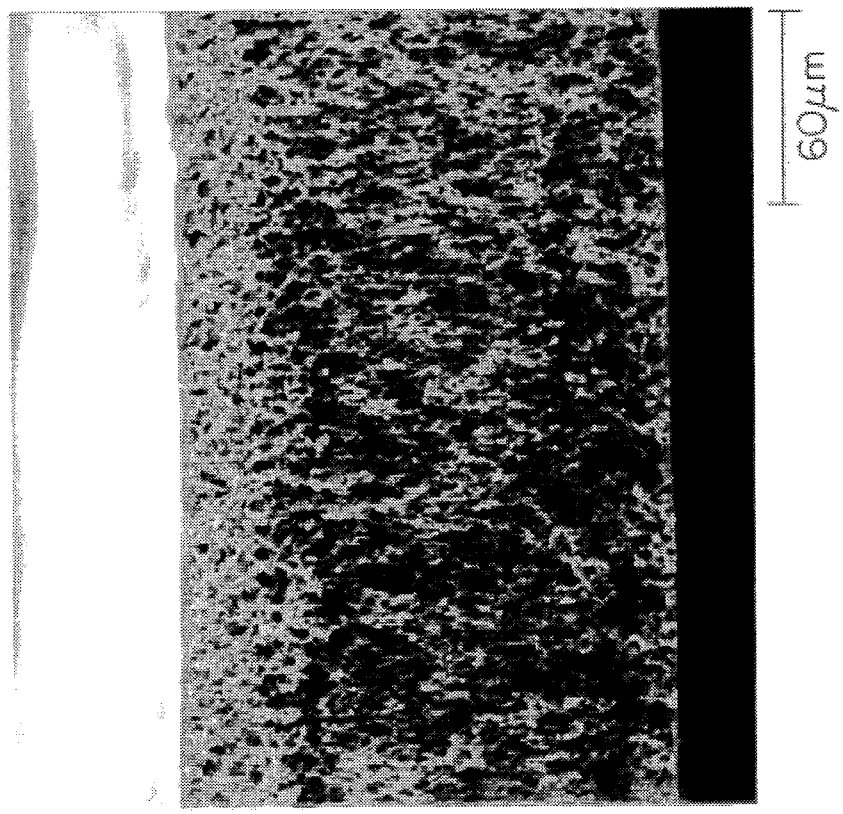
FIG. 4 is a photomicrograph at 396× magnification of a membrane of this invention.

The cross-section of the composite membrane produced by Example 2 is shown in FIGS. 4 and 5. The depth of cellulose infiltration into this polyethylene substrate was approximately 25 microns and the depth of the polyethylene substrate free of cellulose was about 130 microns. The thickness of the cellulose coating above the surface to the UHMW-PE substrate was about 3 microns. The composite membrane was free of defects and had flux and retention characteristics listed in Table 1.

EXAMPLE 3

This example illustrates a process making a 1,300 kD nominal molecular weight cutoff composite ultrafiltration membrane. The method used for Example 3 is the same as in Example 2 with the following exceptions: the coated membrane was immersed in a water bath maintained at a temperature of 50° C.

Figure 7:
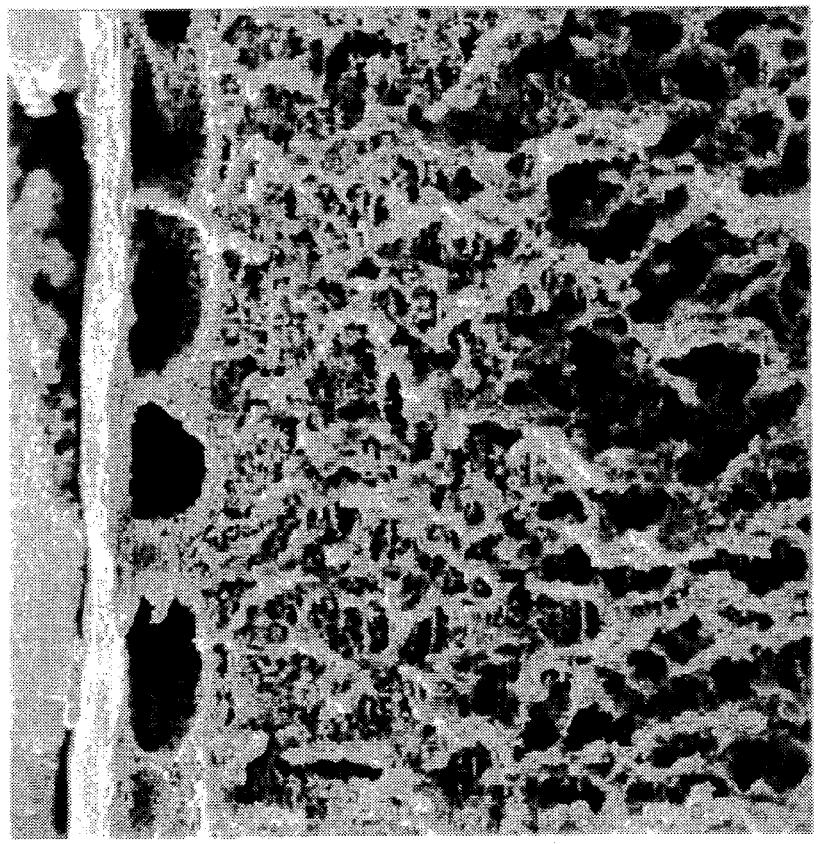
FIG. 7 is a photomicrograph at 1002× magnification of the membrane of FIG. 6.
Figure 6:
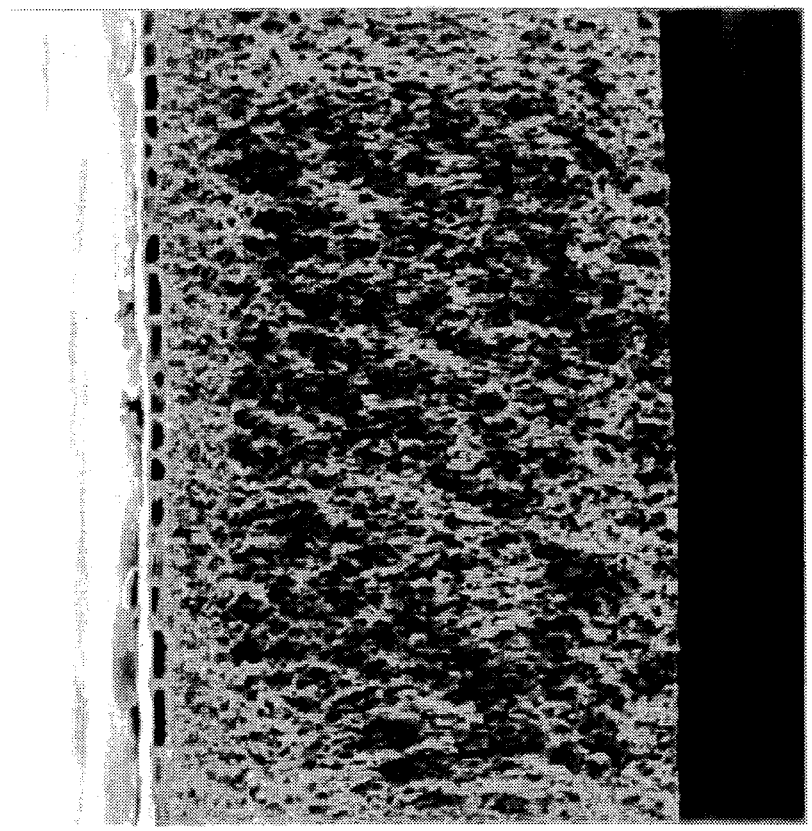
FIG. 6 is a photomicrograph at 397× magnification of the membrane of this invention.

The cross-section of the composite membrane produced by Example 3 is shown in FIGS. 6 and 7. The depth of cellulose infiltration into this polyethylene substrate was approximately 35 microns and the depth of the polyethylene substrate free of cellulose was about 130 microns. The thickness of the cellulose coating above the surface to the UHMW-PE substrate was about 12 microns. Although this membrane clearly contained macrovoids, it was still capable of withstanding high backpressure and had flux and retention characteristics listed in Table 1.

TABLE 1

Water Flux, 90% Dextran Rejection, Backpressure Capability for Some Cellulose Composite Membranes versus Conventional Membranes

|  | 90% Dextran Rejection kD | Flux, gfd/psi | Water Visual Bubble Point, psig | Reverse Pressure Failure, psig |
| --- | --- | --- | --- | --- |
| Example 1 | 14.7 | 3.5 | >90 | >90** |
| Example 2 | 110.0 | 35.5 | >90 | >90** |
| Example 3 | 1310 | 136.2 | 70–90 | >90** |
| PLAC*** | 1.5 | 0.18 | >90 | <25 |
| PLGC*** | 8 | 1.7 | 75–90 | <20 |
| PLTK*** | 30 | 15 | 5–55 | <8 |
| PLHK*** | 120 | 45 | <15 | <7 |
| PLMK*** | 500 | 90 | <10 | <5 |

**Backpressure test system limitation is 60 psig
***PLAC, PLGC, PLTK, PLHK and PLMK are conventional cellulose ultrafiltration membranes manufactured by Millipore Corporation which utilize a Freudenberg non-woven substrate. Values indicated are typical of these membranes.

WATER FLUX

This test is carried out using a computer controlled automated test system. This system collects data on weight of permeate passing through a test cell as a function of elapsed time. The automated system controls pressure to the inlet of the test cell and temperature of the water. The test pressure for the membranes described was 25 psig and the water temperature was 25 Degrees Celsius. A minimum of 15 grams (ml) of water was collected for each membrane tested. The flux was calculated using the membrane area in the test cell open to the flow path, the volume collected, elapsed time and test pressure.

90% DEXTRAN REJECTION

Rejection of model solutes is the most common method for describing the expected performance of ultrafiltration membranes. Thus, nominal molecular weight limits (NMWL) can be determined with a variety of solutes; frequently proteins are used. The NMWL of a UF membrane is typically the molecular mass of the smallest protein that the membrane rejects at a chosen level, usually 90 to 95%. Other solutes that can be used to characterize UF membranes include dextrans, which are available in a large range of molecular weights. The whole rejection spectrum, from molecules of about 1000 daltons molecular weights to molecules of about 2,000,00 daltons to can be measured in a single test.

The test is based on methods published, inter alia, by L. Zeman and M. Wales, in "Separation Science and Technology" 16 (30), p. 275–290 (1981). The membranes to be characterized are challenged with solutions containing polydisperse dextrans with molecular weights 1000 to 2,000,00 daltons in a suitable device; the permeation rate during the test is controlled at low flux to minimize concentration polarization. Feed and permeate streams are sampled and analyzed by size exclusion chromatography (SEC); the chromatographic data is used to calculate rejection as a function of dextran molecular mass.

Rejection (R) with dextran molecular mass is $R=1-Cp/Cf$, where Cp and Cf are the dextran concentrations of given molecular mass in the feed and the permeate, respectively. The molecular weight at which the membrane retains 90% of the dextran feed is the 90% dextran rejection value. Although it is common to call the 90% dextran rejection value a cutoff, care must be taken to distinguish it from cutoffs measured with other solutes such as the solutes used to determine the NMWL.

VISUAL BUBBLE POINT

The visual bubble point test is used to determine the maximum pore size (or defect) of a permeable membrane. The test is based on the fact that liquid is held in the membrane pores by surface tension effects. The minimum, pressure required to force liquid out of the pore is a measure of pore diameter as described by the Washburn equation:

$$P = k4\delta \cos \phi / d$$

where:
P=bubble point pressure
δ=surface tension
ϕ=liquid/solid contact angle
d=pore diameter
k=shape correction factor ASTM Method 316-80 is employed. In general, this bubble point test is performed by prewetting the filter with the liquid to be used (water for the purposes of this work), increasing the pressure of air up-stream of the filter and watching for bubbles downstream of the filter. The pressure at which a continuous stream of bubbles appears is the visual bubble point.

BACKPRESSURE FAILURE

This test is conducted with a system consisting of a modified 293 mm membrane holder (Millipore part number YY3029316), a regulated air pressure source, rotameters to measure air flow (up to 72 cc/min) and miscellaneous valves and tubing. A water wetted membrane is first placed in the test cell. A plastic screen with a 3 mm×3 mm pattern 0.5 mm thick is placed on top of the membrane's ultrafiltration layer. The cell is then closed and sealed. Pressure is applied to the substrate side of the membrane while monitoring both the flow of air upstream from the membrane with rotameters and bubbles formed by the displacement of air downstream of the membrane from a tube inserted into a water filled beaker and connected at the other end to the test cell discharge port. The screen placed in the cell with the membrane allows the ultrafiltration layer to delaminate under the stress of the pressure applied to the substrate side of the membrane. When this occurs, a sharp increase in the flow of air is detected and recorded. The system is designed with a 100 psig maximum pressure capability.

We claim:

1. A back-pressure resistant cellulosic ultrafiltration membrane comprising a performed nonfibrous polymeric microporous base resistant substrate and an ultrafiltration membrane layer formed from a polymer selected from the group consisting of cellulose, a cellulose ester and mixtures thereof said layer having a thickness between about 1 and 20 microns, said polymer extending into said microporous base resistant membrane a distance between 5 and 30 microns and being formed by precipitation and integrally as a separate layer on said microporous base resistant membrane.

2. The cellulosic ultrafiltration membrane of claim 1 wherein said ultrafiltration membrane has a nominal molecular weight cutoff between 500 Daltons and 1,500,000 Daltons.

3. The cellulosic ultrafiltration membrane of claim 1 or 2 wherein said ultrafiltration membrane layer comprises cellulose acetate.

4. The cellulosic ultrafiltration membrane of claim 1 or 2 wherein said ultrafiltration membrane layer comprises cellulose.

5. The cellulosic ultrafiltration membrane of any one of claims 1 or 2 wherein said polymeric microporous base resistant substrate is a polyolefin.

6. The cellulosic ultrafiltration membrane of claim 5 wherein said polyolefin is ultrahigh molecular weight polyethylene.

7. The cellulosic ultrafiltration membrane of claim 6 wherein said ultrafiltration layer comprises cellulose.

8. The cellulosic ultrafiltration membrane of claim 6 wherein said ultrafiltration layer comprises cellulose acetate.

9. The cellulosic ultrafiltration membrane of claim 5 wherein said polyolefin is polypropylene.

10. The cellulosic ultrafiltration membrane of any one of claims 1 or 2 wherein said polymeric microporous base resistant substrate is selected from the group consisting of polysulfone, polyethersulfone and polyarylsulfone.

11. The cellulosic ultrafiltration membrane of claim 10 wherein said ultrafiltration layer comprises cellulose.

12. The cellulosic ultrafiltration membrane of claim 10 wherein said ultrafiltration layer comprises cellulose acetate.

13. The cellulosic ultrafiltration membrane of claim 9 wherein said ultrafiltration layer comprises cellulose.

14. The cellulosic ultrafiltration membrane of claim 9 wherein said ultrafiltration layer comprises cellulose acetate.

15. The cellulosic ultrafiltration membrane of any one of claims 1 or 2 wherein the entire surface of the membrane substrate is rendered hydrophilic which retains substantially the same porous configuration as the membrane substrate.

16. The cellulosic ultrafiltration membrane of claim 15 wherein said substrate is a polyolefin.

17. The cellulosic ultrafiltration membrane of claim 16 wherein said polyolefin is ultrahigh molecular weight polyethylene.

18. The cellulosic ultrafiltration membrane of claim 16 wherein said polyolefin is polypropylene.

19. The cellulosic ultrafiltration membrane of claim 15 wherein said substrate is selected from the group consisting of polysulfone, polyethersulfone and polyarylsulfone.

20. The cellulosic ultrafiltration membrane of claim 15 wherein the ultrafiltration membrane layer comprises cellulose.

21. The cellulosic ultrafiltration membrane of claim 16 wherein the ultrafiltration membrane layer comprises cellulose.

22. The cellulosic ultrafiltration membrane of claim 17 wherein the ultrafiltration membrane layer comprises cellulose.

23. The cellulosic ultrafiltration membrane of claim 18 wherein the ultrafiltration membrane layer comprises cellulose.

24. The cellulosic ultrafiltration membrane of claim 19 wherein the ultrafiltration membrane layer comprises cellulose.

25. The cellulosic ultrafiltration membrane of claim 15 wherein the ultrafiltration membrane layer comprises cellulose ester.

26. The cellulosic ultrafiltration membrane of claim 16 wherein the ultrafiltration membrane layer comprises cellulose ester.

27. The cellulosic ultrafiltration membrane of claim 17 wherein the ultrafiltration membrane layer comprises cellulose ester.

28. The cellulosic ultrafiltration membrane of claim 18 wherein the ultrafiltration membrane layer comprises cellulose ester.

29. The cellulosic ultrafiltration membrane of claim 19 wherein the ultrafiltration membrane layer comprises cellulose ester.

30. The cellulosic ultrafiltration membrane of claim 15 wherein the ultrafiltration membrane layer comprises cellulose ester.

31. A defect-free back-pressure resistant cellulosic ultrafiltration membrane comprising a performed nonfibrous polymeric microporous base resistant substrate and an ultrafiltration membrane layer formed from a polymer selected from the group consisting of cellulose, a cellulose ester and mixtures thereof said layer having a thickness between about 1 and 20 microns, said polymer extending into said microporous base resistant membrane a distance between 5 and 30 microns and being form by precipitation and integrally as a separate layer on said microporous base resistant membrane.

32. The cellulosic ultrafiltration of claim 31 wherein said ultrafiltration membrane has a nominal molecular weight cutoff between 500 Daltons and 1,500,000 Daltons.

33. The cellulosic ultrafiltration of any one of claims 31 or 32 wherein said ultrafiltration membrane layer comprises cellulose acetate.

34. The cellulosic ultrafiltration of any one of claims 31 or 32 wherein said ultrafiltration membrane layer comprises cellulose.

35. The cellulosic ultrafiltration of any one of claims 31 or 32 wherein said polymeric microporous base resistant substrate is a polyolefin.

36. The cellulosic ultrafiltration of any one of claims 31 or 32 wherein said polyolefin is ultrahigh molecular weight polyethylene.

37. The cellulosic ultrafiltration of claim 36 wherein said ultrafiltration layer comprises cellulose.

38. The cellulosic ultrafiltration of claim 36 wherein said ultrafiltration membrane layer comprises cellulose acetate.

39. The cellulosic ultrafiltration of claim 35 wherein said polyolefin is polypropylene.

40. The cellulosic ultrafiltration membrane of any one of claims 31 or 32 wherein said polymeric microporous base resistant substrate is selected from the group consisting of polysulfone, polyethersulfone and polyarylsulfone.

41. The cellulosic ultrafiltration of claim 40 wherein said ultrafiltration layer comprises cellulose.

42. The cellulosic ultrafiltration of claim 40 wherein said ultrafiltration membrane layer comprises cellulose acetate.

43. The cellulosic ultrafiltration of claim 39 wherein said ultrafiltration layer comprises cellulose.

44. The cellulosic ultrafiltration of claim 39 wherein said ultrafiltration membrane layer comprises cellulose acetate.

45. The cellulosic ultrafiltration membrane of any one of claims 31 or 32 wherein the entire surface of the membrane substrate is rendered hydrophilic which retains substantially the same porous configuration as the membrane substrate.

46. The cellulosic ultrafiltration of claim 45 wherein said substrate is a polyolefin.

47. The cellulosic ultrafiltration of claim 46 wherein said polyolefin is ultrahigh molecular weight polyethylene.

48. The cellulosic ultrafiltration membrane of claim 46 wherein said polyolefin is propylene.

49. The cellulosic ultrafiltration membrane of claim 45 wherein said substrate is selected from the group consisting of polysulfone, polyethersulfone and polarylsulfone.

50. The cellulosic ultrafiltration of any one of claim 45 wherein said ultrafiltration membrane layer comprises cellulose.

51. The cellulosic ultrafiltration of claim 46 wherein said ultrafiltration membrane layer comprises cellulose.

52. The cellulosic ultrafiltration of claim 47 wherein said ultrafiltration membrane layer comprises cellulose.

53. The cellulosic ultrafiltration of claim 48 wherein said ultrafiltration membrane layer comprises cellulose.

54. The cellulosic ultrafiltration of claim 49 wherein said ultrafiltration membrane layer comprises cellulose.

55. The cellulosic ultrafiltration of claim 45 wherein said ultrafiltration membrane layer comprises cellulose ester.

56. The cellulosic ultrafiltration of claim 46 wherein said ultrafiltration membrane layer comprises cellulose ester.

57. The cellulosic ultrafiltration of claim 47 wherein said ultrafiltration membrane layer comprises cellulose ester.

58. The cellulosic ultrafiltration of claim 48 wherein said ultrafiltration membrane layer comprises cellulose ester.

59. The cellulosic ultrafiltration of claim 49 wherein said ultrafiltration membrane layer comprises cellulose ester.

60. The cellulosic ultrafiltration of claim 45 wherein said ultrafiltration membrane layer comprises cellulose ester.

* * * * *